United States Patent
Whytock

(10) Patent No.: US 8,695,879 B1
(45) Date of Patent: Apr. 15, 2014

(54) FRAUD PREVENTION

(71) Applicant: NCR Corporation, Duluth, GA (US)

(72) Inventor: Alexander William Whytock, Perthshire (GB)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/664,085

(22) Filed: Oct. 30, 2012

(51) Int. Cl.
*G06K 7/08* (2006.01)

(52) U.S. Cl.
USPC .......................... 235/449; 235/493; 235/382

(58) Field of Classification Search
USPC ......... 235/449, 380, 382, 375, 487, 493, 451, 235/379; 908/8–22
See application file for complete search history.

(56) References Cited

U.S. PATENT DOCUMENTS

| | | | |
|---|---|---|---|
| 8,397,991 B2 * | 3/2013 | Mueller | 235/450 |
| 2007/0080225 A1 * | 4/2007 | Hirasawa et al. | 235/449 |
| 2010/0187300 A1 * | 7/2010 | Ramachandran et al. | 235/379 |
| 2011/0135092 A1 * | 6/2011 | Lehner | 380/252 |
| 2012/0002313 A1 * | 1/2012 | Miyabe et al. | 360/2 |
| 2012/0234913 A1 * | 9/2012 | Ramachandran et al. | 235/379 |

* cited by examiner

*Primary Examiner* — Edwyn Labaze
(74) *Attorney, Agent, or Firm* — Harden E. Stevens, III

(57) ABSTRACT

A method of preventing fraud, and a fraud prevention terminal, are described. The method comprises: detecting an unauthorized reader in the vicinity of a dip card reader, and closing a pin to prevent a card being inserted into the dip card reader.

5 Claims, 4 Drawing Sheets

FRAUD PREVENTION

FIELD OF INVENTION

The present invention relates to fraud prevention at a card reader, and particularly to fraud prevention at a manual insertion hybrid dip card reader.

BACKGROUND OF INVENTION

A hybrid card reader is a card reader that can read a magnetic stripe card, a smart card (also referred to as an integrated circuit card), and a combined magnetic stripe and smart card. To read a magnetic stripe, the stripe must move relative to a magnetic read head; however, to read a smart card having conducting terminals, the card terminals must align, make contact, and remain in contact with terminals used for reading the smart card.

A dip card reader is a reader that does not have any transport mechanism for automatically transporting a card (unlike a motorized card reader/writer), but a dip reader does receive and support an inserted card (unlike a swipe card reader). To use a dip reader, a user must manually insert his/her card, typically short edge first, and then manually remove the card.

A hybrid dip card reader typically comprises a housing having a guide portion extending therefrom. The guide portion is generally u-shaped, defines recesses for receiving opposite long edges of a card, and includes a magnetic read head. The housing contains pivoting read/write smart card terminals that are lowered by a leading edge of an inserted card so that when the card has been fully inserted the read/write terminals align with and contact the card terminals on the card.

Hybrid dip card readers are used in apparatus, such as an automated teller machine (ATM), where a user may insert a magnetic stripe card, a smart card, or a combined magnetic stripe and smart card to conduct a transaction.

Unauthorized reading of card data, such as data encoded on a magnetic stripe of an ATM card, while the card is being used ("card skimming"), is a known type of fraud. In the context of dip card readers on ATMs, card skimming is typically perpetrated by adding a magnetic read head ("unauthorized reader") to a the guide portion of the card reader to read a magnetic stripe on a customer's card as the customer inserts or (more commonly) retrieves the card from an ATM.

An ATM may include a skimmer detection circuit to detect if a card skimmer has been added. However, even if the ATM turns off the card reader, a customer may still insert his/her card into the dip reader. When the card is removed, the unauthorized reader will have read the customer's card.

SUMMARY OF INVENTION

Accordingly, the invention generally provides methods, systems, apparatus, and software for locking a pin in the card reader to prevent insertion of a card on detection of an unauthorized reader.

By preventing insertion of a card, the unauthorized reader will not be able to read the customer's card details from the card.

Conventional dip readers typically include a pin to lock a card within the dip reader when an integrated circuit on the card is being read. In other words, a pin is provided for the purpose of preventing premature removal of the card.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of preventing fraud, the method comprising: detecting an unauthorized reader in the vicinity of a dip card reader, and closing a pin to prevent a card being inserted into the dip card reader.

The step of detecting an unauthorized reader may be implemented by detecting an electromagnetic field created by the unauthorized reader.

Alternatively or additionally, the step of detecting an unauthorized reader may be implemented using a proximity sensor.

The method may comprise the further steps of: detecting absence of the unauthorized reader; and opening the pin to allow a card to be inserted into the dip reader.

The method may comprise the further step of: closing the pin to lock an inserted card in the dip reader.

According to a second aspect of the present invention there is provided a self-service terminal including a dip card reader, the self-service terminal being programmed to: (i) detect an unauthorized reader in the vicinity of the dip card reader, and (ii) close a pin to prevent a card being inserted into the dip card reader.

The terminal may be further programmed to communicate with a remote management center to indicate to the remote management center that an unauthorized reader has been detected.

The terminal may comprise an automated teller machine (ATM).

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
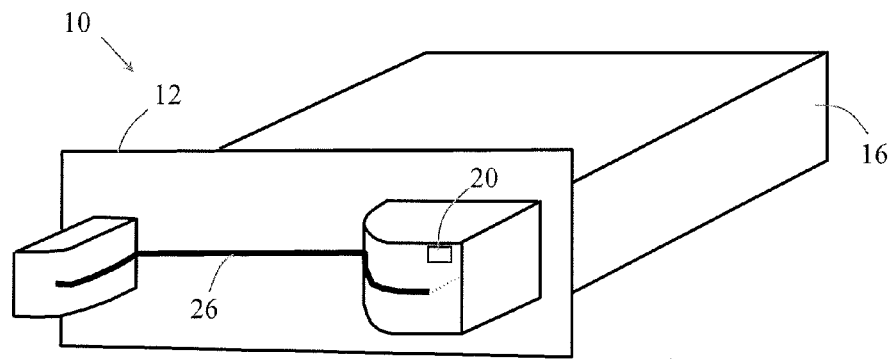
FIG. 1 is a schematic perspective view of a card reader for use with a self-service terminal according to one embodiment of the invention.
Figure 2:
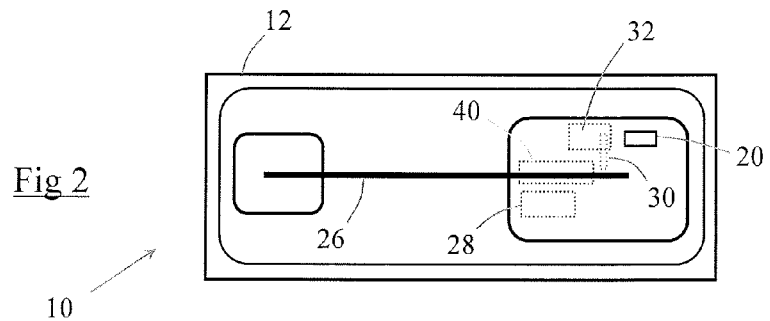
FIG. 2 is a schematic front view of the card reader of FIG. 1.
Figure 3:
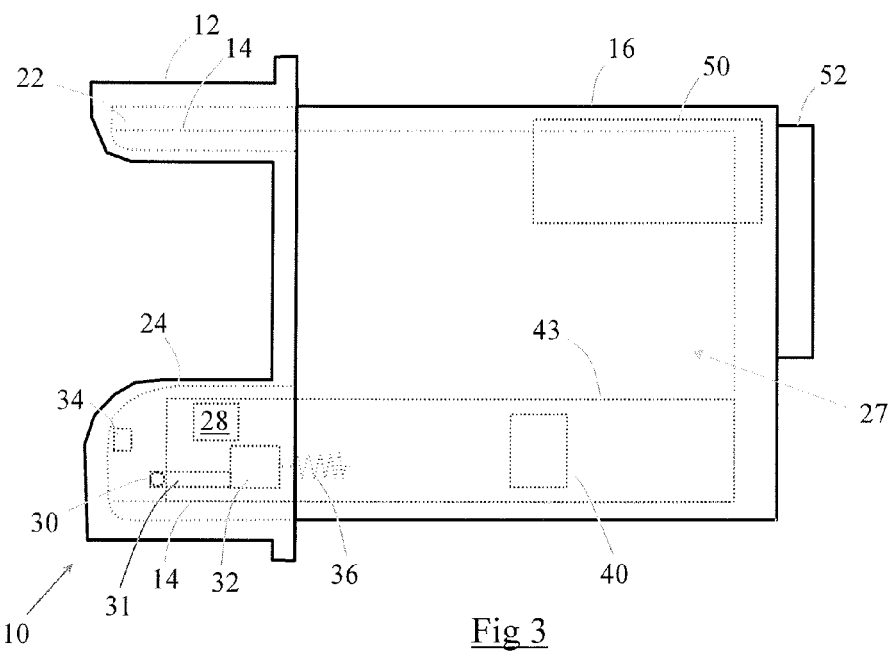
FIG. 3 is a schematic plan view of the card reader of FIG. 1.

Reference is now made to FIGS. 1 to 3, which show a manual insertion hybrid dip card reader 10 for use with a self-service terminal according to one embodiment of the present invention. The card reader 10 comprises a bezel 12 covering a guide portion 14 and extending from a housing portion 16.

The bezel 12 includes a transparent window 20 that aligns with an LED (not shown) in the guide portion 14.

The guide portion 14 has two arms 22, 24; each arm 22, 24 defines a slot that aligns with part of a continuous slot 26 in the bezel 12 for guiding an inserted card through the bezel 12 and guide portion 14, and into a card chamber 27 in the card reader housing portion 16.

Arm 22 is narrower than arm 24 and serves only to guide a card during insertion and removal. Arm 24 is wider than arm 22 and includes: a magnetic read head 28 for reading a magnetic stripe on a card; a pin 30 mounted on a pivoting arm 31; a solenoid 32 for activating the pin 30; and a card sensor 34 for sensing the presence of a card. The solenoid 32 is mounted to the housing portion 16 by a resilient member 36 in the form of a coil spring. When activated, the solenoid 32 pivots the arm 31 to extend the pin 30 across the continuous slot 26 (if no card is present in the bezel 12) or to abut the pin 30 against an upper surface of an inserted card (if a card is present in the bezel 12).

The arm 24 also includes an integrated circuit (smart card) interface 42 for reading terminals on a smart card.

Figure 4:
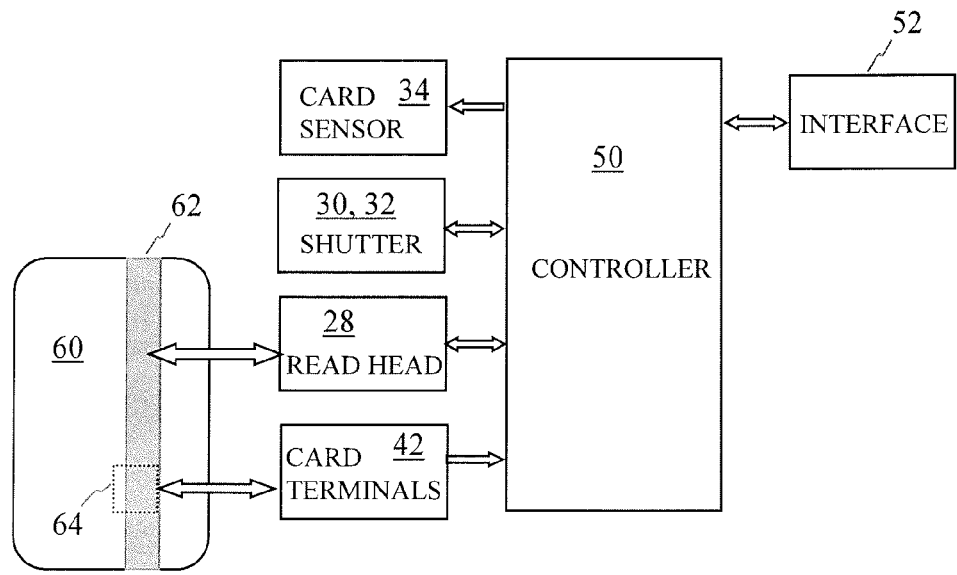
FIG. 4 is a block diagram of the card reader of FIG. 1 interfacing with a card.

The housing portion 16 incorporates a controller 50, as illustrated in FIG. 4, for controlling the operation of the card reader 10. The controller 50 is coupled to a communications interface 52, in addition to being coupled to the shutter mechanism (including the pin 30 and solenoid 32), the magnetic read head 28, the smart card interface 42, and the card sensor 34. The communications interface 52 is coupled to a PC core (not shown in FIG. 4) in a self-service terminal (not shown in FIG. 4) in which the card reader 10 is mounted.

FIG. 4 also illustrates a hybrid card 60 having a magnetic stripe 62 and integrated circuit terminals 64 located on an opposite side of the card 60 to the magnetic stripe 62.

Figure 5:
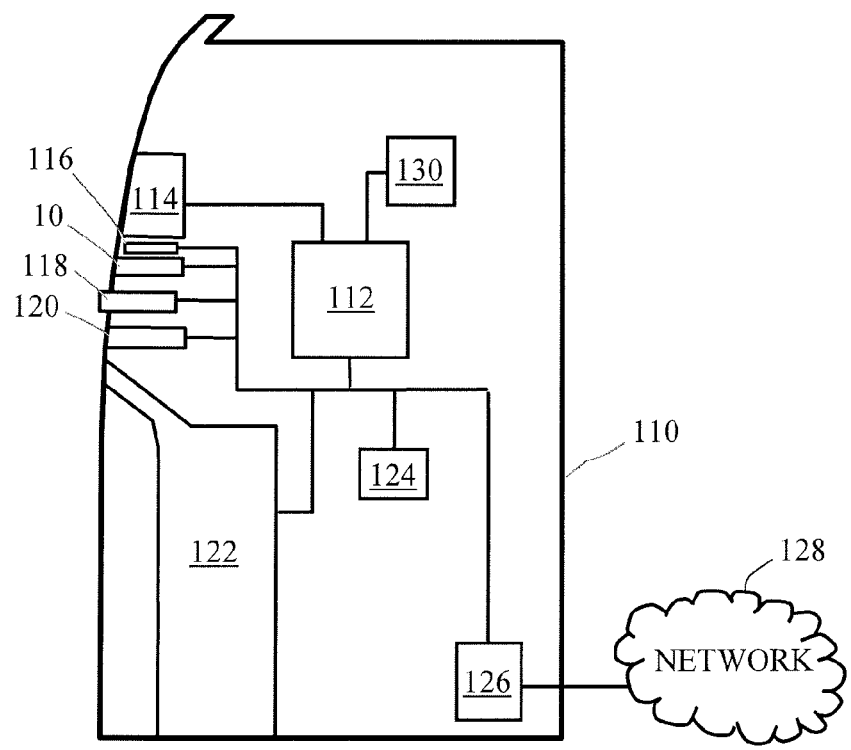
FIG. 5 is a schematic diagram of an SST incorporating the card reader of FIGS. 1 to 4.

Reference is now also made to FIG. 5, which is a schematic diagram of an SST 110 (in the form of an ATM) that incorporates the card reader 10.

The ATM 110 comprises a plurality of ATM modules, including: an ATM controller 112, a customer display 114, the dip card reader 10, an unauthorized reader detector 116, an encrypting keypad module 118, a receipt printer module 120, a cash dispenser module 122, a journal printer module 124 for creating a record of every transaction executed by the ATM 110, a network connection module 126 for accessing a remote authorization system (not shown) via a network 128, and an operator panel module 130 for use by a service operator (such as a field engineer, a replenisher (of currency, of printer paper, or the like), or the like).

The unauthorized reader detector 116 detects the presence of any unauthorized magnetic read head. Such detectors are known to those of skill in the art and are available commercially, for example, the Intelligent Fraud Detection system available from NCR Corporation, Duluth, Ga. 30096, USA.

Figure 6:
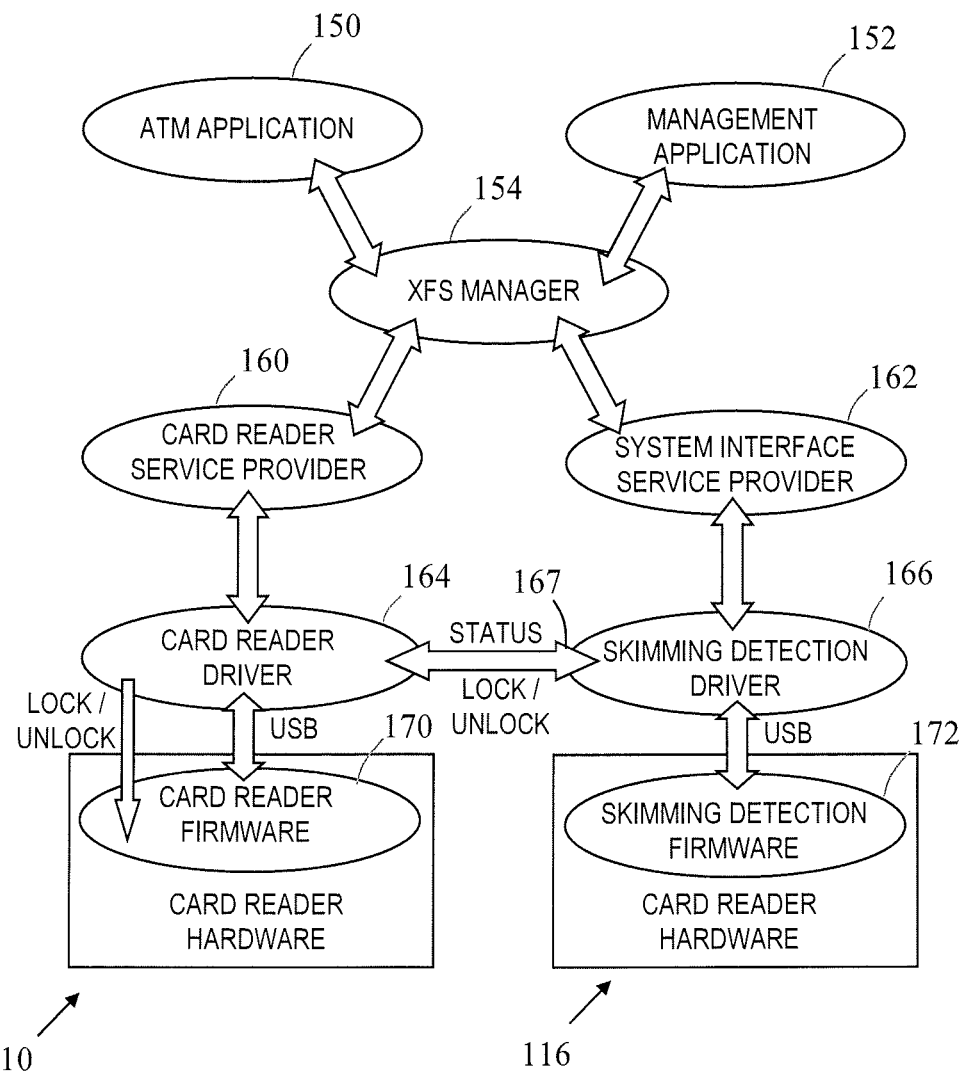
FIG. 6 is a block diagram illustrating some of the software and hardware components within the SST of FIG. 5 that are involved in detecting fraud at the card reader of FIGS. 1 to 4.

Reference will now also be made to FIG. 6, which is a block diagram illustrating some of the software and hardware components within the ATM 110 that are involved in detecting fraud at the card reader 10.

The ATM controller 112 executes an ATM application 150 for controlling the operation of the ATM 110 (for example, performing transactions). The ATM controller 112 also executes a management application 152 for monitoring the state of health of the various modules and components within the ATM 110, and for sending status information to a remote management center (not shown). The ATM controller 112 also executes an XFS manager 154 that interfaces to both the ATM application 150 and the management application 152.

In this embodiment, the ATM 110 operates using the CEN XFS standard. CEN is the European Committee for Standardization, and XFS is the extensions for Financial Services standard. According to this standard the ATM application 150 issues XFS-compliant instructions to (and receives XFS-compliant messages from) the XFS manager 154, which in turn communicates with service providers that control the hardware components within the ATM 110.

The ATM application 150 communicates with a card reader service provider 160 and an SIU (Sensors and Indicators Unit) service provider 162. These service providers communicate with proprietary drivers (a card reader driver 164 and an unauthorized reader detector driver 166 are shown in FIG. 6). These proprietary drivers 164 and 166 can communicate with each other, as illustrated by double-headed arrow 167 in FIG. 6.

The card reader driver 164 controls card reader firmware 170 (which includes the controller 50 and the communication interface 52). Similarly, the unauthorized reader detector driver 166 controls the unauthorized reader detector 116 by communicating with skimming detection firmware 172.

When the unauthorized reader detector 116 detects an unauthorized (or alien) card reader, it creates an alert that is sent to the unauthorized reader detector driver 166. The unauthorized reader detector driver 166 passes this alert to the sensors and indicators unit (SIU) service provider 162 for communication to the ATM application 150. The unauthorized reader detector driver 166 also ascertains the status of the pin 30 from the card reader driver 164.

Figure 7:
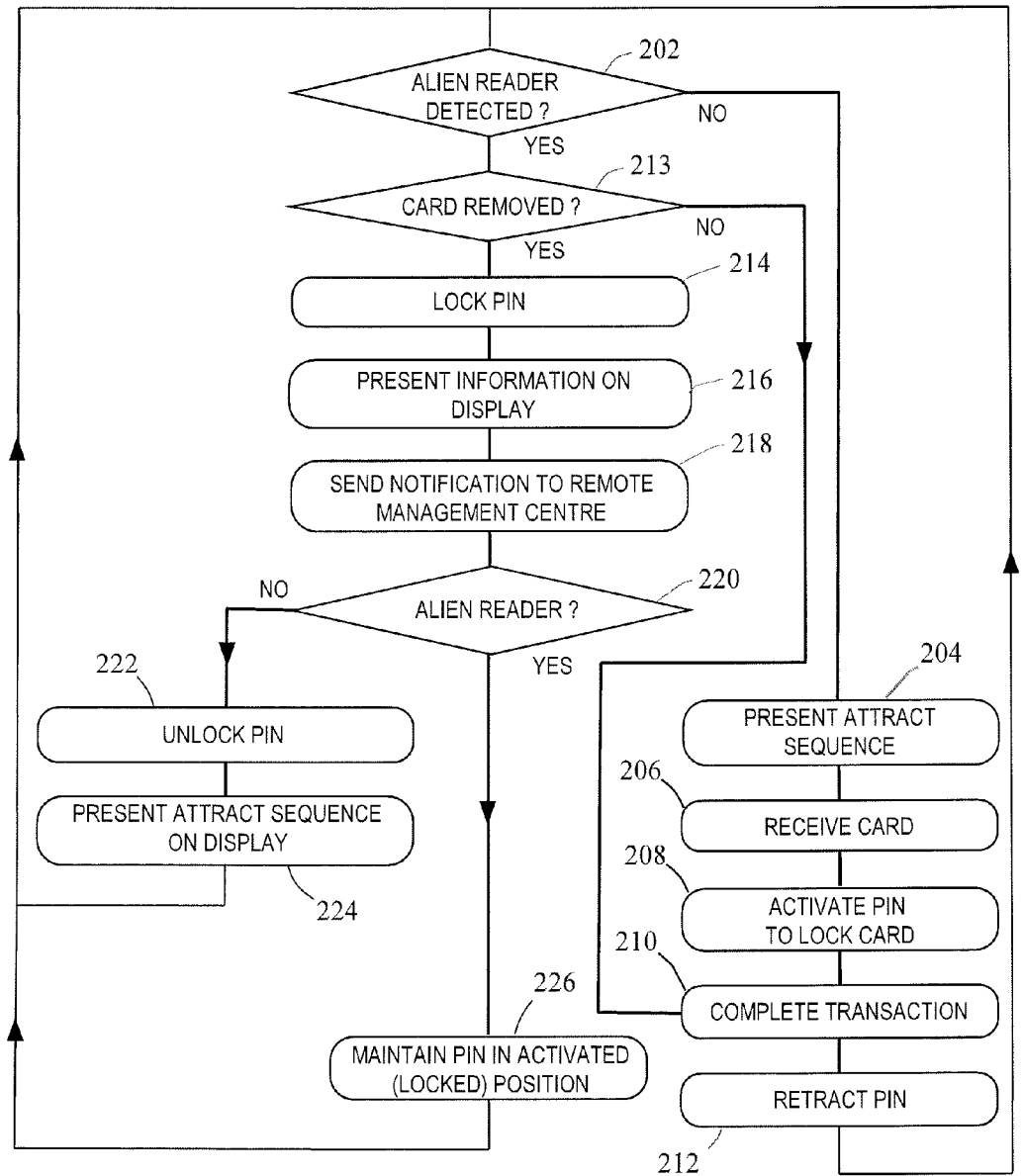
FIG. 7 is a flowchart illustrating the operation of the SST of FIG. 5 in preventing card reader fraud.

Reference will now also be made to FIG. 7, which is a flowchart 200 illustrating the operation of the ATM 110 in preventing card reader fraud.

The unauthorized reader detector 116 continually attempts to detect the presence of any unauthorized card reader in the vicinity of the card reader 10 (step 202).

If no unauthorized card reader is detected, then the ATM application 150 presents an attract sequence on the customer display 114, inviting a customer to insert his/her card into the card reader 10 (step 204).

The card reader 10 then receives the customer's card (step 206). The card reader firmware 170 then activates the pin 30 to lock the customer's card (step 208) during the transaction (which is the conventional use for the pin 30). The transaction is completed (step 210) in the conventional manner. When the transaction is complete, the card reader firmware 170 deactivates (retracts) the pin 30 so that the customer's card is released (step 212), and the customer removes his/her card.

Returning to step 202, if an unauthorized card reader is detected, then the unauthorized reader detector driver 166 checks the status of the card reader 10 (step 213).

If no card is present in the card reader 10, then the unauthorized reader detector driver 166 instructs the card reader driver 164 to activate the pin 30 (step 214). This is implemented by the card reader driver 164 sending a command over the communications interface 52 to the controller 50. On activation, the solenoid 32 causes the pin 30 to extend across the continuous slot 26 in the bezel 12. This prevents any customer card being inserted into the card reader 10.

The unauthorized reader detector driver 166 also sends a notification to the Sensors and Indicators Unit service provider 162 to inform that service provider 162 that the pin 30 on the card reader 10 is being locked. The Sensors and Indicators Unit service provider 162 then informs the XFS manager 154 that this event has occurred. The XFS manager 154 in turn notifies the ATM application 150.

ATM application 150 then presents information on the customer display 114 informing potential customers that the ATM 110 is out of service and that they should not insert their ATM cards into the card reader 10 (step 216).

The unauthorized reader detector driver 166 also sends a notification to the management application 152, which notifies a remote management center (not shown) (via network connection 126 and network 128) that the card reader pin 30 has been locked to prevent customer card insertion (step 218). The remote management center may then schedule a visit to the ATM 110 by a service person.

Returning to step 213, if a card is present in the card reader 10, then the pin 30 is already locked (activated), so the unauthorized reader detector driver 166 allows the transaction to continue (in other words, the flow moves to step 210 to allow the transaction to be completed).

The unauthorized reader detector 116 continues to monitor for any unauthorized card readers (step 220).

If the unauthorized card reader is removed (for example, because the person who attached the card reader notices that the ATM 110 has gone out of service and wants to ensure that the card reader is not captured by a service person) then the unauthorized reader detector 116 instructs the controller 50 (via the card reader driver 164) to de-activate the pin 30 (step 222). This causes the solenoid 32 to retract the pin 30, thereby clearing the continuous slot 26 in the bezel 12 to allow a customer's card to be inserted.

The ATM application 150 then presents an attract sequence on the customer display 114 (step 224), which invites a customer to insert a card into the card reader 10 to initiate a transaction at the ATM 110.

The unauthorized reader detector driver 166 also sends a notification to the management application 152, which is forward to the remote management center (not shown), to indicate that the unauthorized card reader is no longer detected by the unauthorized reader detector 116.

Returning to step 220, if the unauthorized card reader is not removed then the unauthorized reader detector 116 ensures that the controller 50 continues to activate the pin 30 (step 226) so that no card can be inserted.

Various modifications may be made to the above described embodiment within the scope of the invention, for example, in other embodiments, the unauthorized reader detector 116 may also include a jamming function to prevent any unauthorized reader from reading an inserted or removed card.

In other embodiments, the self-service terminal may be different to an ATM, for example, it may comprise a self-checkout terminal, a check-in or check-out terminal, or the like.

In other embodiments, the pin 30 may have a different shape to that shown in the drawings.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method of preventing fraud, the method comprising:
   detecting an unauthorized reader in the vicinity of a dip card reader;
   closing a pin to prevent a card being inserted into the dip card reader;
   detecting absence of the unauthorized reader;
   opening the pin to allow a card to be inserted into the dip reader;
   receiving an inserted card into the dip reader subsequent to opening the pin;
   reading the inserted card; and
   closing the pin during the reading step so that the pin abuts a surface of the inserted card.

2. A method according to claim 1, wherein the step of detecting an unauthorized reader is implemented by detecting an electromagnetic field created by the unauthorized reader.

3. A method according to claim 1, wherein the step of detecting an unauthorized reader is performed using a proximity sensor.

4. A method according to claim 1, wherein the step of closing the pin during the reading step includes extending the pin so that it abuts an upper surface of the inserted card.

5. A method according to claim 1, wherein the step of closing the pin during the reading step includes extending the pin so that it abuts a lower surface of the inserted card.

* * * * *